(No Model.) 3 Sheets—Sheet 1.
O. McCARTHY.
VELOCIPEDE.
No. 437,223. Patented Sept. 30, 1890.
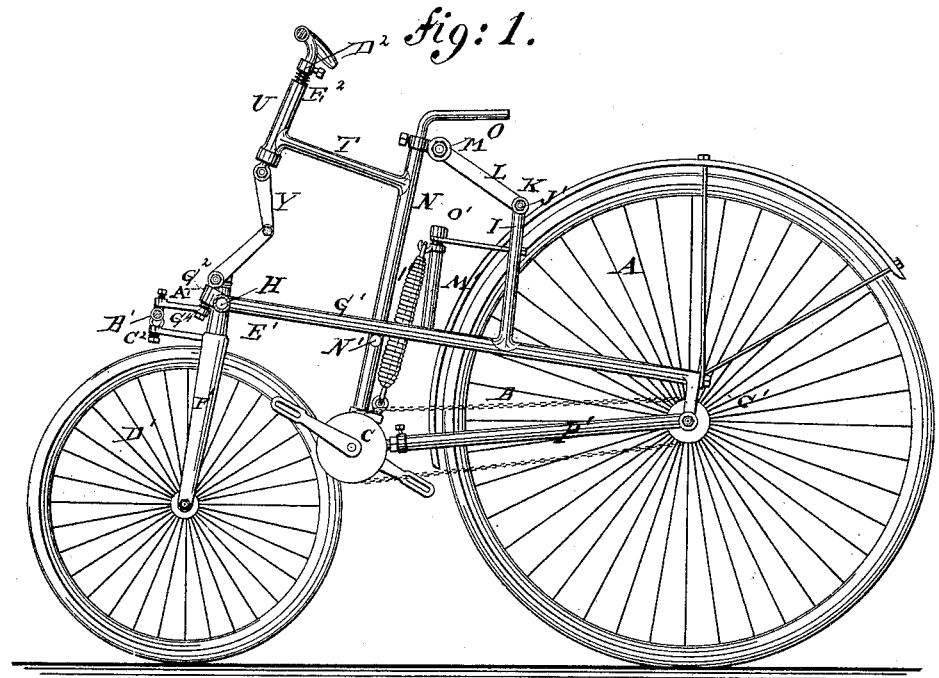
*fig: 1.*
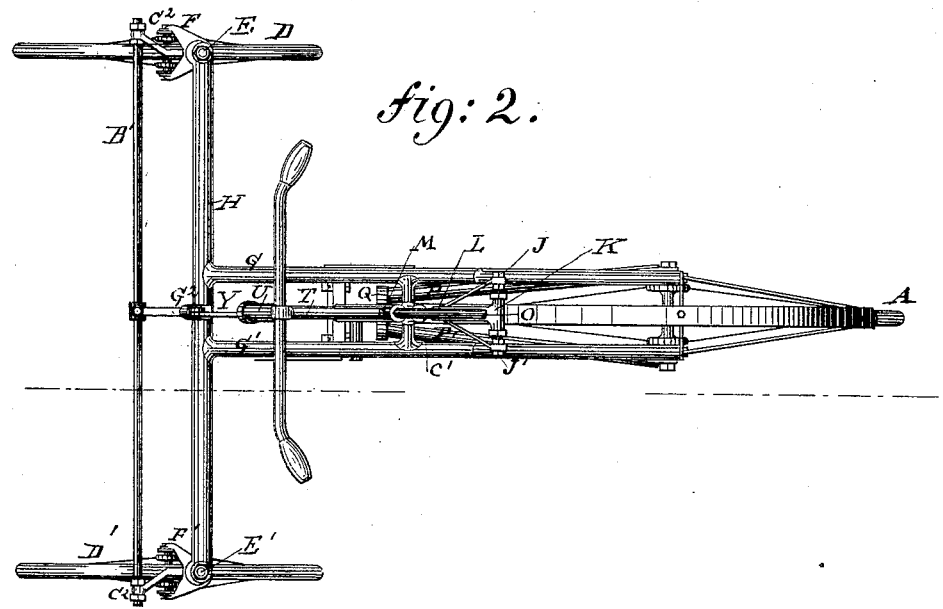
*fig: 2.*
WITNESSES:
INVENTOR
Oxley McCarthy
BY
ATTORNEYS.

(No Model.) 3 Sheets—Sheet 2.
O. McCARTHY.
VELOCIPEDE.
No. 437,223. Patented Sept. 30, 1890.
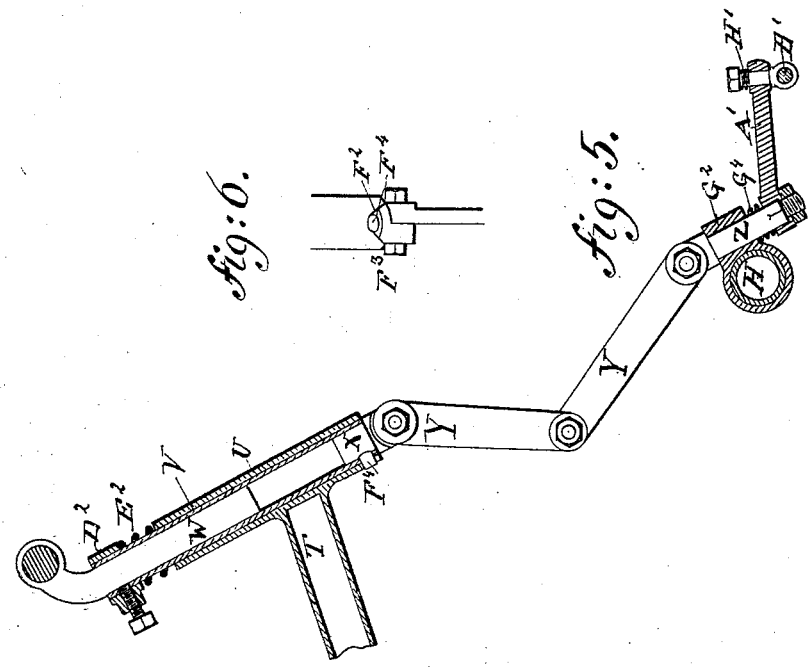
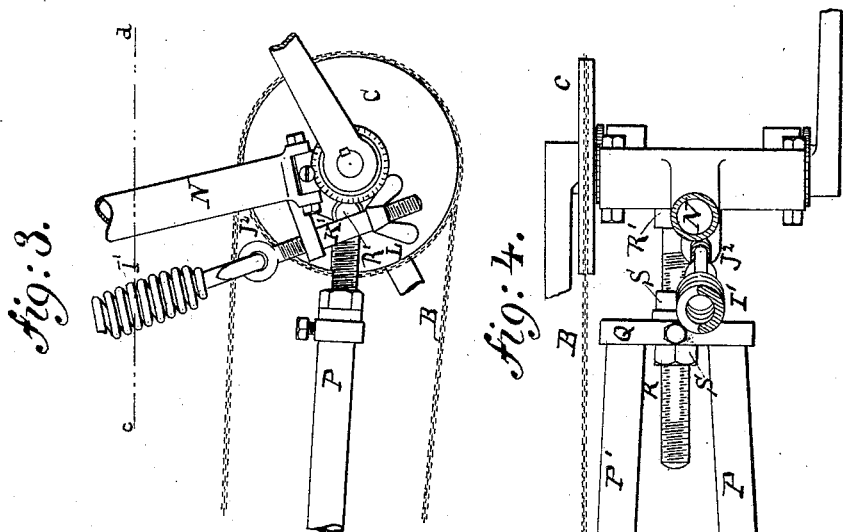
WITNESSES:
D. Petri-Palmedo.
Carl Karp
INVENTOR
Oxley McCarthy
BY
Gorpel & Raegener
ATTORNEYS.

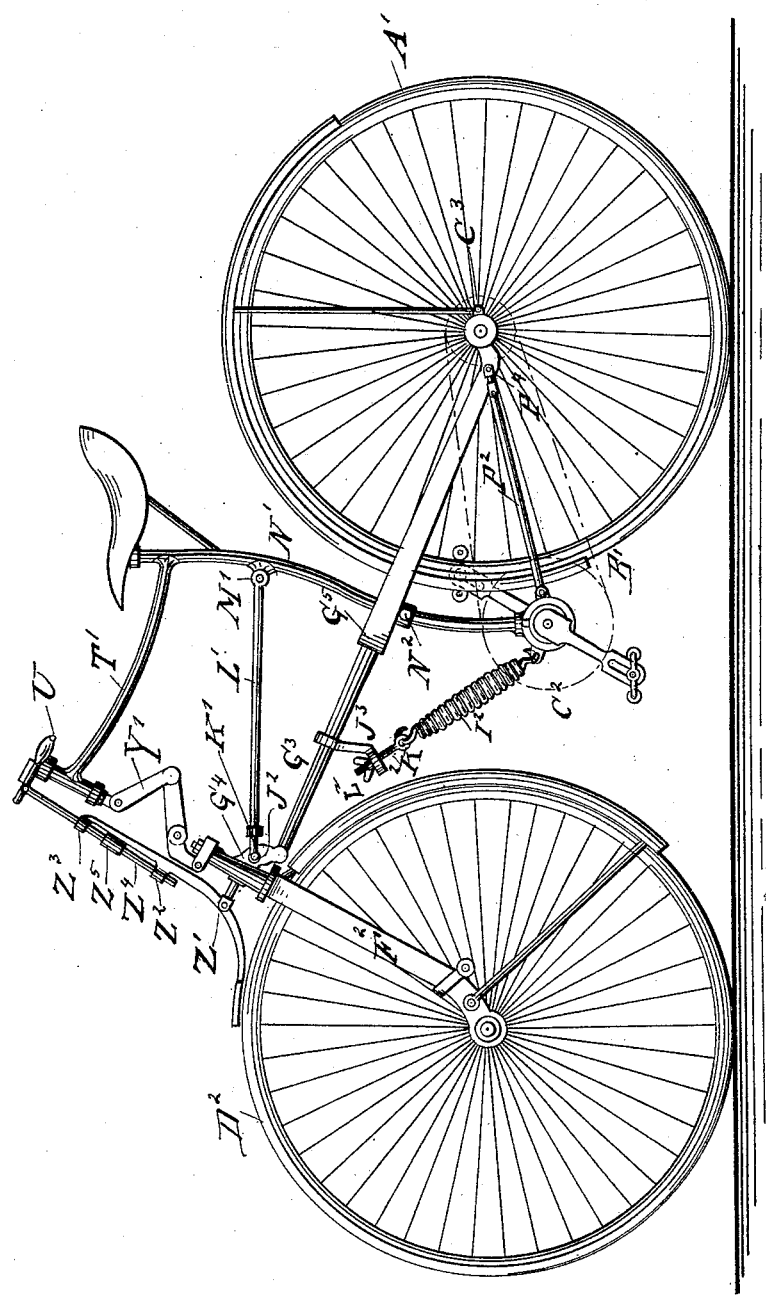

UNITED STATES PATENT OFFICE.

OXLEY McCARTHY, OF LONDON, ENGLAND, ASSIGNOR TO THE OVERMAN WHEEL COMPANY, OF BOSTON, MASSACHUSETTS.

VELOCIPEDE.

SPECIFICATION forming part of Letters Patent No. 437,223, dated September 30, 1890.

Application filed January 14, 1887. Renewed September 15, 1887. Serial No. 249,819. (No model.) Patented in England September 8, 1885, No. 10,610.

*To all whom it may concern:*

Be it known that I, OXLEY MCCARTHY, engineer, of 1 Upper Charles Street, Goswell Road, London, England, have invented certain new and useful Improvements in Velocipedes, (for which I have obtained Letters Patent in Great Britain, No. 10,610, dated September 8, 1885;) and I do hereby declare that the following is an exact and true description thereof sufficient for those versed in the art to practice my invention.

My invention consists in arranging a velocipede—whether a tricycle, bicycle, or otherwise—with a main frame supporting the driving wheel or wheels and steering wheel or wheels, in or on which I pivot or mount a subsidiary frame carrying the seat, pedals or driving mechanism, and the steering mechanism as a whole, controlled by a spring or springs, such subsidiary frame being connected with the steering wheel or wheels by an elastic or toggle joint, whereby such wheel or wheels can be always steered independently of the rise and fall of the handle-bar or steering-handle. I thus prevent shocks reaching the rider or riders (in such manner as to be injurious) when such shocks are caused by the wheels striking stones or like obstructions or slipping into holes, ruts, and the like.

Referring to the accompanying drawings, and to the letters of reference marked thereon, Figure 1 is an elevation of a tricycle constructed according to my invention, part, however, being in section on line $a\ b$ of Fig. 2. Fig. 2 is a plan of the machine; Fig. 3, an enlarged elevation of the crank-shaft and driving-pulley, showing the adjustable stays and spring, hereinafter described. Fig. 4 is a section on line $c\ d$ of Fig. 3; Fig. 5, an enlarged section through the steering apparatus; Fig. 6, back view of the steering-controller, hereinafter referred to; Fig. 7, side elevation of a Safety bicycle fitted with my invention.

In Figs. 1 to 6 my invention is shown applied to a class of tricycle well known to the trade as "The Gnat," in which the large or driving wheel A is in the rear, and is driven by a chain B, passing over pitch-wheels C C', one placed on the driving-wheel axis and the other on the crank-axis, and which may be of dissimilar or equal diameters; or I may use other suitable means of transmitting power from the pedals or treadles to the driving-wheel. The steering is effected by a pair of small wheels D D', having rotary motion on or about vertical or diagonal axes E E', supporting each wheel D D' in forks F F'—that is to say, the steering-wheels D D' turn on the point on which their respective peripheries touch the ground. So far this mere arrangement of driving and steering forms no part of my invention.

I provide a horizontal, or nearly so, tube or pair of rods or tubes G G', carrying at one end the rear driving-wheel A in suitable bearings and extending forward, where they are brazed or otherwise connected to a tube or socket $G^2$ hereinafter called the "steering-socket," mounted on a cross or horizontal tube or rod H, to the respective ends of which the two small wheels D $D^2$ are pivoted in forks F F, or they may be fitted in other axial movements. From the horizontal or nearly horizontal tubes or rods G G' extends vertically upward a rod or tube which I hereinafter call the "pivot-tube," carrying centers J J'. On these centers J J' work the arms of a yoke or fork K on a rod or tube L hereinafter called the "link," jointed at its other end M to a downwardly-extending tube or rod N hereinafter called the "pedal-tube," carrying at its lower end the cranks or pedals and at its upper end the adjustable rod O for the saddle or seat, as shown. From the crank-axis to the axis of the driving-wheel A, I arrange a pair of adjustable rods, stays, or tubes P P', capable of rocking or oscillating on the driving-wheel axis, and so maintaining the required distance between the crank and driving-wheel axes. I connect these rods or stays or tubes by a bar Q, through which passes a screwed rod R, connected by a joint R' to the lower end of the pedal-tube N and so that the nuts S S can by being screwed up draw the bar Q and the rods, stays, or tubes P P' toward the pedal-tube N, and so maintain their tension and prevent "sagging." I might only use one rod or stay, if desired, and I am aware that rods or stays have been used to maintain a required distance between a crank-axis and the driving-axis of a velocipede, and I lay no claim to the mere use of a stay or stays for this purpose unless the same oscillate from one end and be jointed at the other, as in my invention.

From the aforesaid pedal-tube N extends a stay or tube T, connecting the same to a (preferably) diagonal tube or socket U hereinafter called the "steering-tube," and more particularly shown in section, Fig. 5. Through this tube or socket U passes a tube V, into which is adjusted the rod W, carrying at its top the usual cross-bar and steering-handle. The lower end of this tube V carries a rigid plug X, to which is jointed a toggle-lever Y, attached to a rod or pin Z, passing through the aforesaid steering-socket $G^2$, and which rod or pin is connected to a short arm A', carrying a horizontal rod B', connected to the axes or forks of the small steering-wheels D D' by bent or cranked rods $C^2$, so as to obtain greater amplitude of movement.

If desired, the rod or pin Z and the steering-socket $G^2$ may be coned, or ball-bearings could be fitted thereto. The rod W might pass directly through the steering-tube U and have the toggle connected to its end, the tube V and the plug X being dispensed with; but I adopt the plan shown in order to readily adjust the height of the cross-bar and handles.

Many velocipedes having "cross-bar" steering not being of the automatic or "fly-to-center" type are fitted with what is known as a "controller" or "friction-brake" to check the too easy movement of the steering-handles.

The device shown, though not claimed as new, is useful as an adjunct to my invention. It consists in mounting on the tube V an adjustable collar $D^2$, which, while also clamping the rod W in the tube V, confines a spiral spring $E^2$ between itself and the top of the tube U. I also bevel the bottom of the tube U on the back part, as shown in Fig. 6 at $F^2 F^3$, and mount a stud $F^4$ on the plug X in the tube V, so that as the handles are turned the tube V rises and falls in the steering-tube U, and the spring $E^2$ is compressed or released and the too ready movement of the steering-handles checked. I also prefer to put a spring $G^4$ between the bottom of the steering-socket $G^2$ and the eye of the short arm A' and another between the head of the pin H', connecting the horizontal rod B' with the short arm A' and the other eye of the arm A', to lessen vibration. To the pedal-tube N or crank-bearing is secured one end of a strong spiral or other spring I', passing through an eye $J^2$ on an adjusting-screw K', adjusted by a fly-nut L', or a pair or other number of springs may be used. The other end of the spring I' is hooked or secured to a pillar M' on one of the rods G G' or to the pivot-tube, if desired.

I have now, as shown, a tricycle driven by the back-wheel through a pedal-axis, which forms part of a frame that carries the saddle or seat, also the steering mechanism. Thus the entire weight of the rider is carried on centers with spring intervening between the said rider and the carrying-wheels. On the saddle or seat being mounted, the "pedal-tube" is depressed, according to the weight of the rider, who is now elastically supported. An elastic or rubber stop or buffer N' on the pedal-tube limits the upward play and a similar buffer O' on the pillar M' the downward play. The rider is therefore not affected by shocks to the wheels, and the connection to the steering-rod passing through the steering-tube and the pin or rod passing through the steering-socket being elastic by means of the aforesaid toggle or jointed lever the machine may be always steered irrespective of the rider's vertical position. I may, if desired, construct the said steering-socket in two parts, one interlocking with the other and secured by fly or lock nut, and capable, by slackening the latter and pulling one part from the other, of allowing the horizontal rod or tube carrying the axes of the small steering-wheels to be hoisted, so as to lessen the width of the machine for transport or storage; but this forms no part of my invention and is not claimed as such.

For a "sociable" for two riders I may use two pivoted pedal-tubes with their pedals, stay-rods, springs, and appurtenances, placing one on each side of the driving-wheel, each rider driving the same, and one or both steering.

Fig. 7 shows my invention applied to a Safety bicycle of the rear-driving and front-steering type. A' is the driving-wheel. B' is the chain passing over the pitch-wheels $C^2 C^3$, one placed on the driving-wheel axis and the other on the crank-axis, as before referred to in the description of the tricycle. $D^2$ is the steering-wheel mounted in fork $F^2$. $G^3$ is a tube carrying at one end the neck $G^4$ and at the other end a fork $G^5$ to mount the bearings of the driving-wheel A'. $J^2$ are centers on the neck, or they might be on the tube $G^3$, on which I pivot the arms of a yoke or fork K' on the rod or tube L', (in the tricycle called the "link,") jointed at its other end M' to a downwardly-extending rod or tube N', (in the tricycle called the "pedal-tube,") carrying at its lower ends the cranks or pedals, and at its upper end the saddle or seat. $P^2 P^2$ are the adjustable rods, stays, or tubes, capable of rocking or oscillating on the driving-wheel axis, and so maintaining the required distances between the crank and driving-wheel axis. As shown, I have not placed them to oscillate on the center of wheel A', but a little before it, and I have shown the end of the tube $P^2$ to receive a plug $P^4$, pivoted to the fork G and adjustable so as to keep the tube $P^2$ tight and capable of compensating for wear. The rods, tubes, or stays $P^2 P^2$ are arranged, as in Figs. 3 and 4. $N^2$ is the buffer to limit the play of the tube or rod N'. As shown, for the bicycle I prefer to adjust the spring $I^2$ from its upper end, passing through an eye $J^3$, in which an adjusting-screw $K^2$ works. Fly-nut $L^2$ works the screw $K^2$. U is the steering tube or socket carried by the tube T', and Y' the toggle-lever or elastic joint connecting the steering-rod and the steering-head. To compensate for the rise and fall of the steering-socket, to which the brake-gear is attached, I arrange the brake-lever Z' with bosses $Z^2 Z^3$, and in these I arrange to work the brake-rod $Z^4$, actuating the spoon-lever Z'. $Z^5$ is a boss or lug on rod $Z^4$, so as to abut on bosses $Z^2 Z^3$, whereby I operate the brake to go on or off, according as $Z^5$ touches $Z^2$ or $Z^3$, and so puts or takes off the brake. The brake-rod is of course actuated by the usual or other handle, as will be understood.

It will be apparent that my invention can be adapted to tricycles of the ordinary front or rear steering pattern controlled by side steering-handles, or to "Cripper" velocipedes using balance or clutch driving-axles and "handle-bar" steering, my pedal-tube, pivot-tube, joints, spring, and toggle or elastic steering joint being used as before.

I claim—

1. A velocipede having a main frame provided with driving and steering wheels, a subsidiary frame mounted upon the main frame, so as to vertically cushion independent thereof, and a seat and driving and steering mechanisms attached to the subsidiary frame and partaking of the motion thereof, substantially as set forth.

2. A velocipede having a main frame provided with driving and steering wheels, a subsidiary frame pivotally mounted upon the main frame, a spring supporting the subsidiary frame, which vertically cushions independent of the main frame, and a seat and driving and steering mechanisms attached to the subsidiary frame and partaking of the motion thereof, substantially as set forth.

3. A velocipede having a main frame provided with driving and steering wheels, a subsidiary frame carrying a seat and driving and steering mechanisms and vertically cushioning independent of the main frame upon which it is mounted, and flexible connection between the said steering mechanism and the steering-wheel, substantially as set forth.

4. A velocipede having a main frame provided with driving and steering wheels, a subsidiary frame carrying a seat and driving and steering mechanisms, and a pivoted stay or brace to preserve the integrity of the relation between the two frames, substantially as set forth.

5. A velocipede having a main frame provided with driving and steering wheels, a subsidiary frame carrying a seat and driving and steering mechanisms and vertically cushioning independent of the main frame upon which it is mounted, and stops or buffers for limiting the cushioning action of the said subsidiary frame, substantially as set forth.

6. A velocipede having a main frame provided with driving and steering wheels, a subsidiary frame carrying a seat and driving and steering mechanisms, a spring supporting the subsidiary frame, which cushions vertically independent of the main frame upon which it is mounted, and flexible connection between the said steering mechanism and the steering-wheel, substantially as set forth.

7. A velocipede having a main frame provided with driving and steering wheels, a subsidiary frame carrying a seat and driving and steering mechanisms and cushioning vertically independent of the main frame upon which it is mounted, and a toggle-connection between the said steering mechanism and wheel, substantially as set forth.

8. A velocipede having a main frame provided with driving and steering wheels, a subsidiary frame having a seat and driving and steering mechanisms and cushioning vertically independent of the main frame upon which it is mounted, and an adjustable oscillating stay or brace for preserving the integrity of relation between the two frames, substantially as set forth.

9. A velocipede having a main frame provided with driving and steering wheels, a subsidiary frame provided at its upper end with a seat, at its lower end with driving mechanism, and at its forward end with steering mechanism and cushioning vertically independent of the main frame upon which it is mounted, and flexible connection between the said steering mechanism and steering-wheel, substantially as set forth.

10. A velocipede having a main frame provided with driving and steering wheels, a subsidiary frame pivotally mounted upon the main frame so as to cushion vertically independent thereof, and a seat-support and driving mechanism attached to the subsidiary frame and partaking of the motion thereof, substantially as set forth.

11. A velocipede having a main frame provided with driving and steering wheels and a subsidiary frame carrying a seat and driving mechanism and isolated from vibration by a spring connected with the main frame upon which the subsidiary frame is mounted, substantially as set forth.

12. A cycle having a main frame, a seat-support and driving mechanism rigidly connected together, a spring connected with the main frame and supporting the seat-support and driving mechanism, which are thus cushioned against vibration, and a rocking brace interposed between the crank of the driving mechanism and the main axle of the main frame to resist the tendency of the chain to pull them together, substantially as set forth.

In testimony that I claim the foregoing as my invention I have signed my name in presence of two subscribing witnesses.

OXLEY McCARTHY.

Witnesses:
E. GARDNER COLTON,
   *Fel. Inst. P. A.*
C. F. ENNIS.